United States Patent

Tan

[15] 3,689,690

[45] Sept. 5, 1972

[54] COLOR TELEVISION CAMERA PROVIDED WITH ONE PICK-UP TUBE AND A COLOR FILTER WITH MEANS FOR CONVERTING A SEQUENTIAL OUTPUT TO A SIMULTANEOUS OUTPUT

[72] Inventor: Sing Liong Tan, Emmasingel, Eindhoven, Netherlands

[73] Assignee: U.S. Phillips Corporation, New York, N.Y.

[22] Filed: Sept. 11, 1970

[21] Appl. No.: 71,627

[30] Foreign Application Priority Data

Sept. 20, 1969 Netherlands..............6914309

[52] U.S. Cl..............................178/5.4 ST, 178/5.4 C
[51] Int. Cl..............................H04n 9/06, H04n 9/42
[58] Field of Search .................178/5.4 ST, 5.4 C, 5.4 R, 5.4 CF

[56] References Cited

UNITED STATES PATENTS

| | | | |
|---|---|---|---|
| 2,870,249 | 1/1959 | James | 178/5.4 C |
| 3,030,437 | 4/1962 | James et al | 178/5.4 C |
| 3,407,265 | 10/1968 | Krause | 178/5.4 ST |
| 3,553,356 | 1/1971 | Groll | 178/5.4 R |

*Primary Examiner*—Robert L. Richardson
*Attorney*—Frank R. Trifari

[57] ABSTRACT

A color television camera including a color filter for reproducing a scene alternately in a different color on a target plate in a pick-up tube. The target plate is not completely scanned by an electron beam during each line period, but one line is scanned in short spaced parts. The parts which are scanned and which are not scanned are partially scanned during the next field period. The output of the pick-up tube is connected to a convertor in which the signals generated by the tube are combined without memory, but in a switching manner to substantially simultaneously occurring chrominance signals.

12 Claims, 4 Drawing Figures

Figure 1:
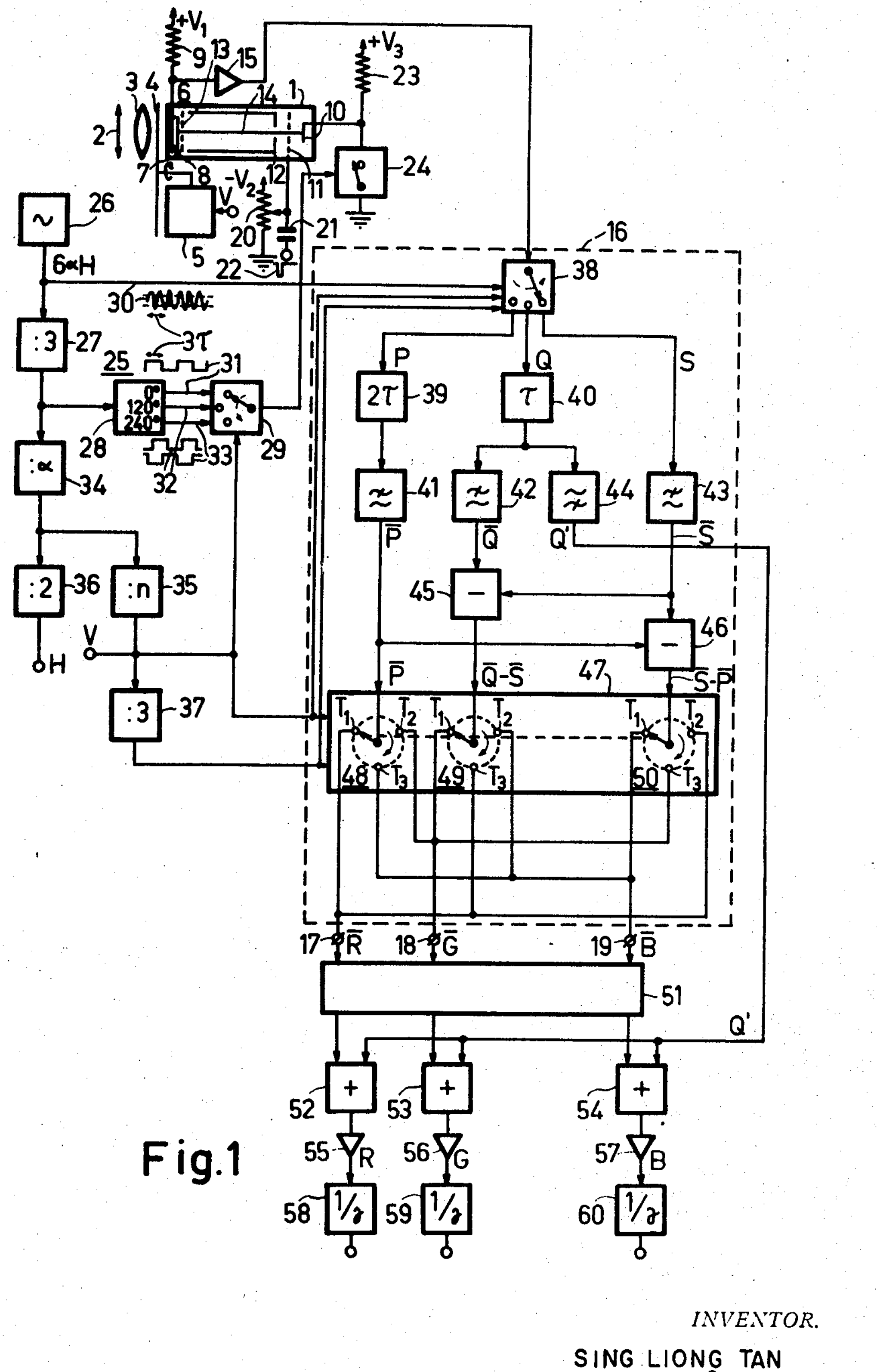

INVENTOR.
SING LIONG TAN
BY Frank R. Trifari
AGENT

INVENTOR.
SING LIONG TAN
BY
AGENT

INVENTOR.
SING LIONG TAN
BY
AGENT

INVENTOR.
SING LIONG TAN
BY
AGENT

COLOR TELEVISION CAMERA PROVIDED WITH ONE PICK-UP TUBE AND A COLOR FILTER WITH MEANS FOR CONVERTING A SEQUENTIAL OUTPUT TO A SIMULTANEOUS OUTPUT

The invention relates to a color television camera provided with one pick-up tube and a color filter for reproducing alternately in a different color a scene to be picked up on a target plate in the pick-up tube. The tube includes an electron gun for generating an electron beam scanning the target plate line by line and field by field, and the camera includes a convertor coupled to an output of the pick-up tube for converting picture signals field-sequentially generated by the pick-up tube into substantially simultaneously occurring picture signals at the outputs of the convertor.

Such a color television camera is described in "-Television Engineering Hnadbook," by D.G. Fink, on pages 17–98 to 17–103 of the 1957 edition. Particularly page 17–102 shows in a block diagram an embodiment of a convertor which is indicated as a chromacoder. The text states that for converting the field-sequentially generated picture signals into simultaneously occurring chrominance signals it is required to equip the chromacoder with memories. The single pick-up tube is connectable to three memories each formed with a display tube which is optically coupled to a pick-up tube. The connection is effected alternately to one of the memories as a function of the color component which is passed by the color filter. The pick-up tubes in the memories supply simultaneous chrominance signals at a given desired repetition frequency by causing the line and field deflection in the display tubes and the single pick-up tube of the camera to take place three times faster during one third of the repetition period.

In practice, such a complicated convertor including a field memory in a camera is found to be an expensive component. The economy in price of a color television camera based on field-sequential signal generation as compared with that based on simultaneous signal generation is thereby eliminated.

It is an object of the present invention to provide a color television camera in which the convertor may be formed without an expensive memory. To this end the camera according to the invention is characterized in that the electron gun of the pick-up tube is connected to a generator supplying a signal periodically interrupting the electron beam during each line scan period.

A further embodiment is characterized in that the said generator is formed as a generator supplying a more or less square-wave signal at a phase shift of approximately 120° per field.

The invention is based on the recognition of the fact that the pick-up tube itself may be used as a memory. To this end, the charge image which corresponds to a color component of the scene to be picked up and which is present on the target plate in the pick-up tube is not completely read out during each line period in a raster. The omitted portions of a line are read out during a following field period together with a new charge image which is associated with a further color component of the scene.

Figure 2:
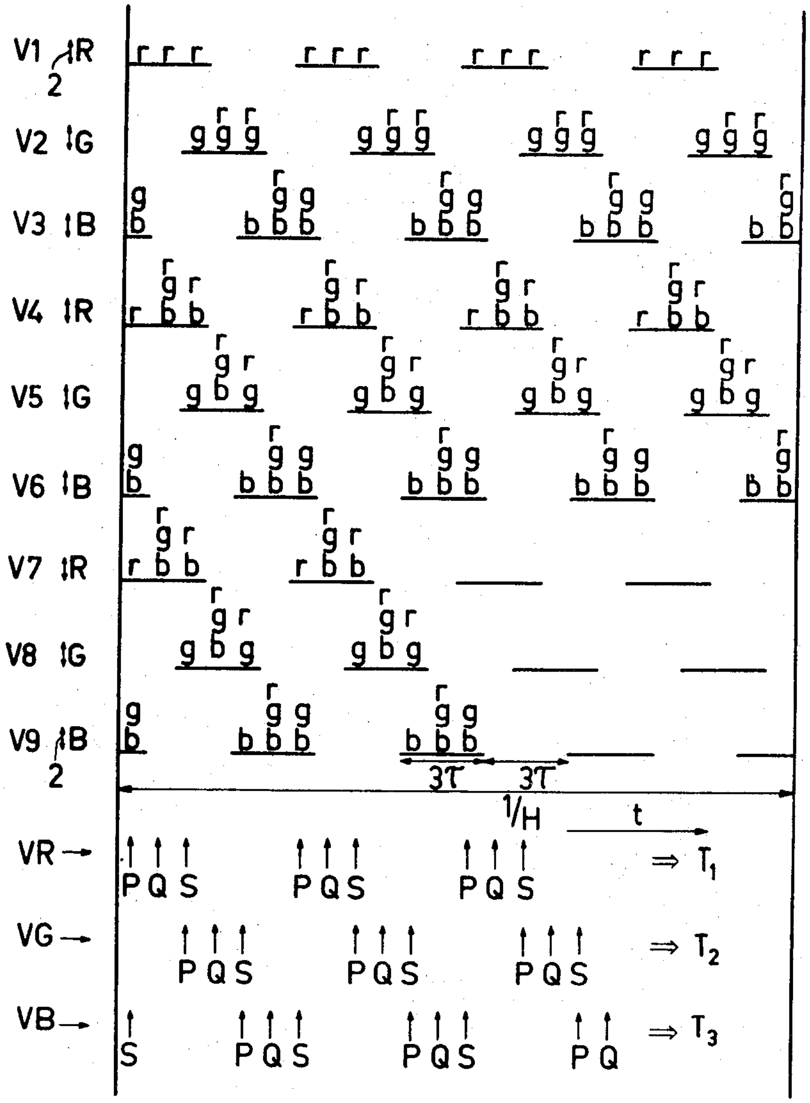
Figure 3:
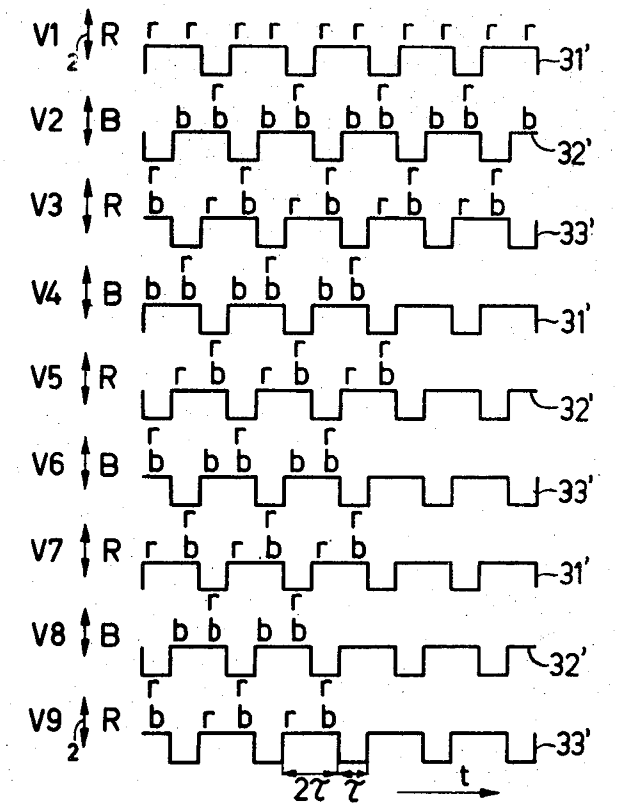
Figure 4:
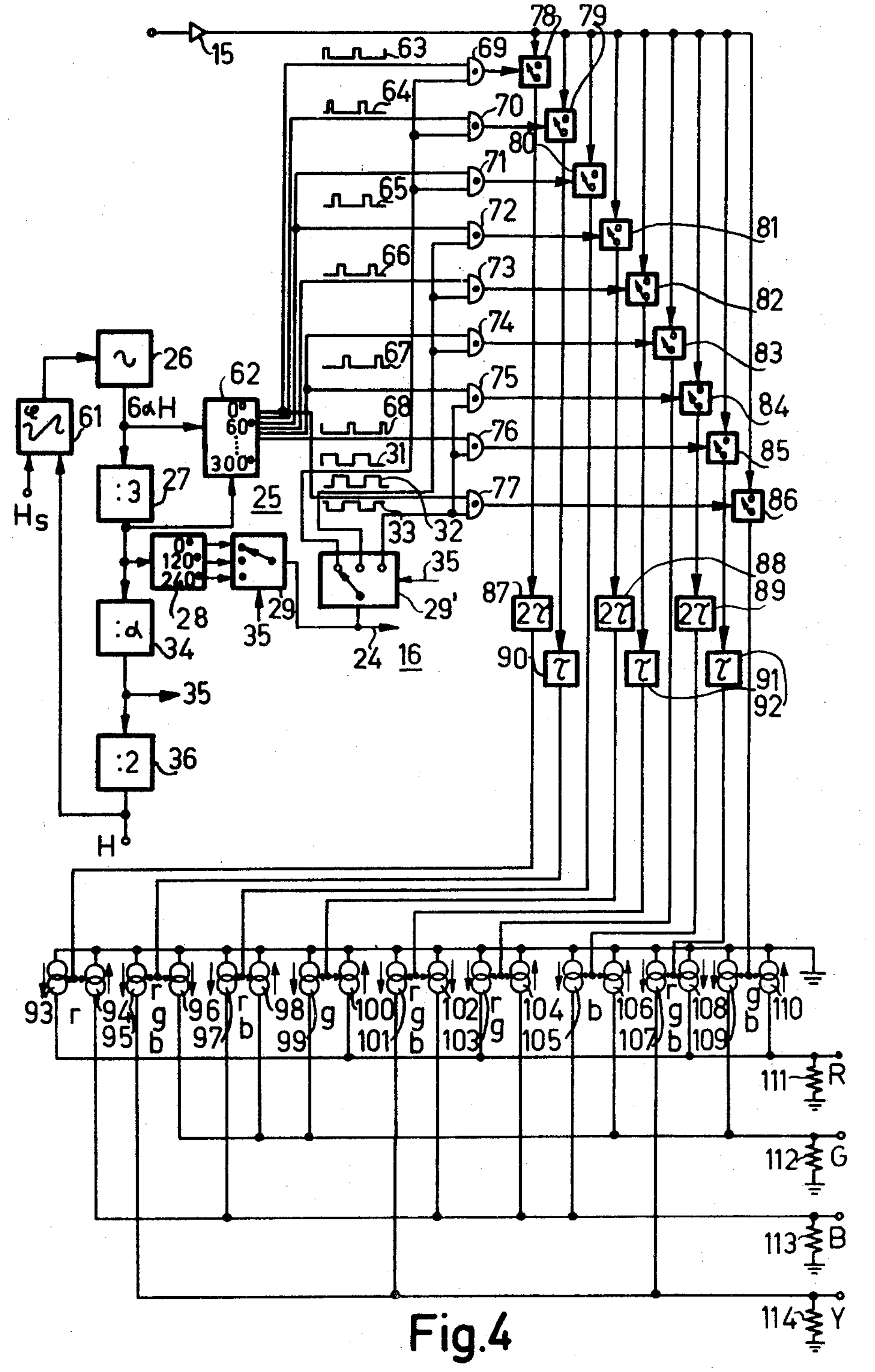

In order that the invention may be readily carried into effect, some embodiments thereof will now be described in detail by way of example with reference to the accompanying diagrammatic drawings, in which:

FIG. 1 illustrates in a block diagram an embodiment of a color television camera according to the invention, FIG. 2 serves to explain the principle of the invention for a camera according to FIG. 1 and diagrammatically shows the scanning in a pick-up tube, FIG. 3 diagrammatically shows the scanning in a camera suitable for use in a television system based on two primary colors and FIG. 4 shows an embodiment of a convertor described with reference to FIG. 1 and suitable for integration.

In FIG. 1 the reference numeral 1 denotes a pick-up tube which forms part of a color television camera. The camera picks up a scene 1 indicated by an arrow by reproducing this scene through an objective lens 3 and a color filter 4 on the pick-up tube 1. The color filter 4 is formed as a rotatable disc which is provided with portions passing red, green and blue light and which is rotated by a motor 5. A signal of frequency V is applied to the motor 5 so that the red, green and blue light components of the scene 2 alternately act on the pick-up tube 1 during a period of approximately 1/V seconds. The color filter 4 may alternatively be formed as a liquid filter or with rotating prisms.

The light component of the scene 2 passed by the color filter 4 is projected onto a target plate 6 in the pick-up tube 1. The target plate 6 is built up from a transparent conductive signal plate 7 and a photosensitive semiconductor layer 8. The signal plate 7 is connected to a resistor 9 whose other end is connected to a terminal $+V_1$. The terminal $+V_1$ as well as further voltage-conveying terminals to be described hereinafter forms part of a voltage source ($V_1$) not shown a further terminal of which is connected to ground.

The pick-up tube 1 is provided with an electron gun which is composed of a cathode 10, an electrode 11 formed as a Wehnelt cylinder and an acceleration electrode 12. A grid 13 is provided between the acceleration electrode 12 and the target plate 6. The electron gun (10, 11, 12) generates an electron beam 14 under the influence of voltages applied to the cathode 10 and the electrodes 11 and 12, which electron beam may be focussed and line and field deflected by means not shown. In the described pick-up tube 1, which is of the vidicon type, the scene 2 projected onto the target plate 6 is converted due to the local influence of the conductivity in the semiconductor layer 8 into a charge image on the free surface of the semiconductor layer 8. The charge image is read out line by line and field by field with the aid of the electron beam 14, so that a resultant varying voltage drop across the resistor 9 provides a picture signal corresponding to the scene 2. An amplifier 15 connected to the junction of resistor 9 and target plate 6 applies the picture signal generated by the pick-up tube 1 to a convertor 16.

The convertor 16 serves for converting the light components of the scene 2, which are field-sequentially passed by the color filter 4 and are converted into picture signals in the pick-up tube 1, into simultaneously occurring picture signals. The picture or chrominance signals R, G and B corresponding to the red, green and blue light components of the scene 2 occur at the output terminals 17, 18, and 19, respectively, of the convertor 16. In FIG. 1, the characters $\bar{R}$, $\bar{G}$ and $\bar{B}$ are shown at the terminals 17, 18 and 19 in which, as will be apparent hereinafter, the stripe notation indicates chrominance signals limited in bandwidth.

To be able to obtain a simple and cheap embodiment of the convertor 16, the picture signal is generated by the pick-up tube 1 in a given manner according to the invention. The electrode 11 formed as a Wehnelt cylinder is connected to a tap on a potentiometer 20 which is arranged between ground and a terminal $-V_2$. Negatively directed pulses 22 are applied through a capacitor 21 to the electrode 11, which pulses serve as line blanking pulses for the pick-up tube 1 occurring during the line fly-back period. According to one aspect of the invention, the cathode 10 is connected to a junction in a series arrangement of a resistor 23 and an on-off switch 24 which are connected between the terminal $+V_3$ and ground. The on-off switch 24 is driven by a generator which consists of an oscillator 26 followed by a divide-by-three circuit 27, a phase shifter 28 and a three-position change-over switch 29. The oscillator 26 supplying a signal 30 at a frequency of $6\alpha H$ provides through the divide-by-three circuit 27 and the phase shifter 28 having one input and three outputs the signals 31, 32 and 33 shifted $2\pi/3$ radians or 120° in phase and shown at the outputs. A period $3\tau$ is indicated in the signals 31 and 30. The period $3\tau$ is half a period of the signals 31, 32 and 33. The phase shifter 28 may be formed as a shift register. The on-off switch 24 is switched on during the positively directed signal portions in the signals 31, 32 and 33 alternately passed on through the change-over switch 29. The switch 29 in the generator 25 is changed over with the aid of an $\alpha$-divider 34 and an $n$-divider 35 which are connected in series with the divide-by-three circuit 27. The $n$-divider 35 supplies a signal at a frequency V which is equal to the field frequency so that the change-over switch 29 occupies one of the three positions during each field period. Change-over switch 29 has completed one cycle after three field periods. The $\alpha$-divider 34 is followed by a divide-by-two circuit 36 so that an output thereof supplies a signal of frequency H. The frequency H is the line frequency. The factor $\alpha$ is an integer and may be several tens or hundreds. The number $n$ indicates the number of lines constituting a raster or field or particularly in case of an interlaced structure the number from which a picture composed of two fields is built up. Multifold interlacing would alternatively be possible. The $n$-divider 35 is followed by a divide-by-three circuit 37 whose purpose will be apparent from the following description.

To explain the embodiment of a color television camera according to the invention shown in FIG. 1, FIG. 2 will be described in connection with FIG. 1. FIG. 2 shows diagrammatically as a function of time $t$ how the target plate 6 in the pick-up tube 1 is scanned line by line and field by field or picture by picture. It has been indicated for nine successive pictures V1 to V9 which light component of the scene 2 (R for red, G for green and B for blue) is passed by the color filter 4. One line scanning is shown for each picture V1 . . . . . V9 which is effected during one period 1/H while the flyback period during one line period has been left out of consideration.

The starting point is that after switching on the camera the signal 31 is passed on by the change-over switch 29 during a first picture period (V1). During the positively directed signal portions in the signal 31, the switch 24 is switched on and the cathode 10 of the pick-up tube 1 is connected to ground. The electron gun (10, 11, 12) then generates an electron beam 14 scanning the target plate 6. The amplifier 15 supplies an amplified picture signal which for the first picture V1 corresponds to the red light component of the scene 2. In FIG. 2 this has been indicated by the small character $r$. During the negatively directed signal portions in the signal 31 the switch 24 is switched off so that the potential $+V_3$ is impressed on the cathode 10 and the electron beam 14 of the electron gun (10, 11, 12) is cut off. During this period the target plate 6 is not scanned and the pick-up tube 1 does not supply a picture signal. In FIG. 2 this is shown by means of the four interrupted portions in the picture V1. For the sake of simplicity four scanning periods are shown for each line period in FIG. 2; in practice the number of scanning periodes for each line period amounts from several tens to several hundreds. During the picture period V2 the change-over switch 29 passes the signal 32 so that the target plate 6 is scanned with a phase shift. In FIG. 2 it is indicated at V2 that the green light component $g$ of the scene 2 will occur in the picture signal during the first one third of one scanning period. During the remaining two thirds the red light component $r$ left from the previous picture V1 will also appear in the picture signal. The pictures V1 and V2 indicate the transient phenomenon of the camera.

During the picture period V3 with the signal 33 the blue component $b$ of the scene 2 occurs in the picture signal during the first one third of one scanning period. During the second part the picture signal comprises the red component $r$ of the first picture period V1, the green component $g$ of the second picture period V2 and the blue component $b$ of the third picture period V3. In the third part the picture signal gives the sum of the green component $g$ of the picture V2 and the blue component of the picture V3.

It may be found in the manner indicated that the picture signal in the picture V4 provides successively the components $r$, $r+g+b$, $r+b$ during one scanning period. The components $g$, $r+g+b$, $r+g$ occur in the picture V5 while the components $b$, $r+g+b$, $g+b$ occur again in the picture V6. The pictures V3, V4 and V5 constitute a cycle which is repeated in the pictures V6, V7 and V8 and further pictures. It is found that the pick-up tube 1 provides a picture signal in the manner described which signal comprises successively in one cycle of three pictures, to be started with an arbitrary picture, all color components of the scene 2.

The convertor 16 serves to convert the described picture signal into simultaneously occurring chrominance signals. To this end the convertor 16 is provided with a three-position change-over switch 38 which is driven by the signal 30 supplied by the oscillator 26. Two levels are denoted by broken lines in signal 30, a passage of a level resulting in a change-over of the switch 38. One switching cycle is performed over a period $3\tau$. Three signal channels are connected to three outputs of the change-over switch 38 which channels as well as the signals will be denoted by the references P, Q and S. The signals P, Q and S comprise picture signals which are determined by the position of the color filter 4. The signal content of the signals P, Q and S follows from FIG. 2 at VR, VG and VB. For a picture VR, $P=r$, $Q=r+g+b$ and $S=r+b$.

For a picture VG, $P=g$, $Q=r+g+b$ and $S=r+g$.

For a picture VB, $P=b$, $Q=r+g+b$ and $S=g+b$.

It is found that for all pictures the signal Q is the same and represents the luminence of the scene 2.

The signals P and Q are applied to delay circuits 39, 40, respectively, having a delay period of $2\tau$, $\tau$. The signals P, Q and S simultaneously occurring under the influence of the delay circuits 39 and 40 are applied to lowpass filters 41, 42 and 43, respectively, which supply signals $\overline{P}$, $\overline{Q}$ and $\overline{S}$ which are limited in bandwidth. When using an oscillator 26 with a signal of high frequency and a resultant short delay period $2\tau(2\tau=1/6\alpha H)$ the delay circuits 39 and 40 may be omitted. The signal Q is applied to a highpass filter 44 which supplies a signal $Q'$ of high frequency. The filter 42 applies the signal $\overline{Q}$ to a superimposition stage shown as a subtractor stage 45 in which the signal $\overline{S}$ also applied thereto is subtracted so that the signal $\overline{Q}-\overline{S}$ results. The lowpass filter 43 supplying the signal $\overline{S}$ is connected to a subtractor stage 46 in which the signal $\overline{P}$ also applied thereto is subtracted so that the signal $\overline{S}-\overline{P}$ results. The signals $\overline{P}$, $\overline{Q}-\overline{S}$ and $\overline{S}-\overline{P}$ are applied to a switching stage 47. Switching stage 47 is formed with three three-position change-over switches 48, 49 and 50 whose switching limbs are mechanically coupled. Corresponding output terminals of the switches 48, 49 and 50 are denoted by $T_1$, $T_2$ and $T_3$. The output terminal of 17 of the convertor 16 is connected to the terminal $T_1$ of change-over switch 48, terminal $T_3$ of change-over switch 49 and terminal $T_2$ of change-over switch 50. For the terminal 18 there applies: $T_1$ of 49, $T_2$ of 48 and $T_3$ of 50. For the terminal 19 there applies, $T_1$ of 50, $T_2$ of 49 and $T_3$ of 48. The position of the switching limbs of the change-over switches 48, 49 and 50 is to be varied with the field frequency and with one third thereof, to which end the dividers 35 and 37 are connected to the switching stage 47. For adjusting a phase-relationship corresponding thereto the dividers 35 and 37 are also connected to the change-over switch 38.

FIG. 1 shows that the switching limbs in the switching stage 47 are connected to the terminal $T_1$ which is required when a picture VR occurs. It follows from FIG. 2 that during a picture VR the signals $P=r$, $\overline{Q}-\overline{S}=r+g+b-(r+b)=g$ and $\overline{S}-\overline{P}=r+b-r=b$ are applied to the switching stage 47 and occur at the terminals 17 ($\overline{R}$), 18 ($\overline{G}$) and 19 ($\overline{B}$). For a picture VG the signals $\overline{R}$, $\overline{G}$ and $\overline{B}$ also occur at the terminals 17, 18 and 19, when the switching stage 47 is in the position $T_2$ when the signal $P=g$, $\overline{Q}-\overline{S}=r+g+b-(r+g)=b$ and $\overline{S}-\overline{P}=r+g-g=r$ is applied. The position $T_3$ is associated with a picture VB. One cycle is completed after three pictures.

The terminals 17, 18 and 19 are connected to a linear matrix circuit 51 in which an improvement of the color purity can be obtained by a combination of the signals $\overline{R}$, $\overline{G}$ and $\overline{B}$ upon display on a display screen. Three outputs of the matrix circuit 51 are connected to superimposition stages formed as adder stages 52, 53 and 54, respectively, while also the luminance signal $Q'$ of high frequency is applied to each stage. The adder stages 52, 53 and 54 supply the signals R, G and B through amplifiers 55, 56 and 57 which are thus composed in accordance with the principle of the so-called "mixed highs." The signals R, G and B may be applied to gamma-correctors 58, 59 and 60.

It is found from the embodiment given in FIG. 1 of a color television camera according to the invention that the pick-up tube 1 is not only used for picking up the scene 2 but is also used as a memory due to the ingenious way of scanning. The oscillator frequency 6αH is related to the cross-section of the electron beam 14 and it can be chosen to be more than 2 MHz for a circular cross-section thereof. When using an elliptical cross-section with the long axis at right angles to the line scanning direction, considerably higher oscillator frequencies can be used.

In FIG. 1 the cathode 10 of the electron guns (10, 11, 12) is coupled to the generator 25 for interrupting the electron beam 14. Instead it is alternatively possible to connect the generator 25 to the electrode 11 formed as a Wehnelt cylinder while the amplitude of the pulses in the signals 31, 32, and 33 should be greater.

It is found that the convertor 16 converts the picture signal generated by the pick-up tube 1 in a switching manner into more or less simultaneously occuring chrominance signals by means of combination of closely spaced points in the line scanning direction. Due to the combination in the line scanning direction it follows that interlaced scanning may be used in the pick-up tube 1 without further difficulties. Even multifold interlacing, for example, one picture composed of four fields is quite possible.

FIGS. 1 and 2 describe color television cameras for a system based on the principle of three primary colors, namely red, green and blue. FIG. 3 shows a scanning diagram which is suitable for a camera in a system based on the principle of two primary colors, for example, red R and blue B. The explanation with reference to the scanning diagram of FIG. 2 largely corresponds to FIG. 3.

FIG. 3 shows signals 31′, 32′ and 33′ which have the same function as the signals 31, 32 and 33 in FIG. 1. One scanning period amounts to twice the blanking period, but the phase shift of 120° in the switching signal supplied to on-off switch 24 remains. After a transient phenomenon of one picture one cycle of two pictures occurs when $b$ and $r+b$ are obtained during one picture and $r$ and $r+b$ are obtained during the other picture. A second cycle of six pictures occurs in which V2 and V8, V3 and V9 etc. are identical. After the described embodiment of the converter 16 in FIG. 1, the simpler embodiment of a convertor associated with the scanning diagram of FIG. 3 will not present difficulties to those skilled in the art so that this embodiment will not be described.

FIG. 4 shows an embodiment of the convertor 16 for a system employing three primary colors which may be composed in a simple manner from existing integrated electronic components. Components already denoted in FIG. 1 have been provided with the same reference numerals. The oscillator 26 shown in FIG. 4 is formed as a controlled oscillator which is coupled to a phase discriminator 61. The signal of frequency H supplied by the divider 36 and a synchronizing signal $H_s$ are applied to the phase discriminator 61.

The signal of frequency 6αH supplied by the oscillator 26 is applied to a phase shifter 62. Under the influence of a signal supplied by the divide-by-three circuit 27, the phase shifter 62 provided with six outputs and formed, for example, as a shift register supplies six signals shifted over $2\pi/6$ radians i.e. 60° which signals are successively denoted by 63 to 68. The convertor 16 is formed with nine AND gates 69 and 77, each interconnected input of the gates 69 . . . 71, 72 . . . . . 74 and 75 . . . 77 being connected to an output of a change-over switch 29' having three outputs. The single input and output of the synchronously switching change-over switches 29' and 29, respectively, are interconnected. The signals 63, 64, 65, 65, 66, 67, 67, 68, 63 are applied to a second input of each AND-gate 69 . . . . . . . . . . 77, respectively. When the change-over switches 29 and 29' supply the signal 31 the result is that the AND-gates 69, 70 and 71 successively come in their conducting conditions and alternately pass on a pulse. Signals 32 and 33 supplied by the change-over switches 29 and 29', respectively, have the result that the AND-gates 72, 73 and 74 and 75, 76 and 77, respectively, pass on a pulse. The AND-gates 69 . . . . . . . 77 drive nine on-off switches 78 to 86. The switches 78 . . . . . . . . 86 are interconnected on one side and are connected to the output of the picture signal amplifier 15. The other sides of the switches 78, 81 and 84 are connected to the delay circuits 87, 88 and 89, respectively, having a delay period of $2\tau$. The switches 79, 82 and 85 are connected to the delay circuits 90, 91 and 92 respectively, having a delay period of $\tau$. The delay circuit 87 is connected to two controllable current sources 93 and 94 two terminals of which are interconnected with opposite current directions and are connected to ground. The delay circuit 90 controls two controllable current sources 96 and 95 two terminals of which are interconnected with the same current direction which will further be referred to as the positive direction and are connected to ground. The on-off switch 80 is directly connected to two controllable current sources 97 and 98 which are arranged similarly as sources 93 (+) and 94 (−). The current sources 93–98 are connected to the amplifier 15 by means of the AND-gates 69, 70 and 71 and the on-off switches 78, 79 and 80. In connection with FIG. 2 it follows that the signal $r$ is applied to the current sources 93 and 94, the signal $r+g+b$ is applied to the current sources 95 and 96 and the signal $r+b$ is applied to the current sources 97 and 98.

Similarly as for the switches 78, 79 and 80, the switches 81, 82 and 83, and 84, 85 and 86 are followed by six controllable current sources 99 to 104 and 105 to 110, respectively. In connection with FIG. 2 the signals shown in FIG. 4 for the current sources 99 . . . . . . . . 110 follow, which signals are controlled by these sources. The ground-insulated terminals of the current sources 93 . . . . 110 are partially interconnected in four groups, each group being connected to ground through a resistor 111, 112, 113 or 114. The resistors 111, 112, 113 and 114 are connected to terminals where the characters R, G and B and Y are provided. The terminal R is connected to the sources 93, 100, 103, 108 and 110. The terminal G is connected to the sources 96, 98, 99, 106 and 109. The terminal B is connected to the sources 94, 97, 102, 104 and 105. The terminal Y is connected to the sources 95, 101 and 107.

During a picture VR with the associated signal 31, the current sources 93 . . . . . . . 98 can conduct and the current sources 99 . . . . . 110 cannot conduct. As a result a current $+r$ from source 93 flows through resistor 111. Source 96 $(r+g+b)$ and source 98 $(-r-b)$ together supply a current $+g$ through resistor 112. Source 97 $(r+b)$ and source 94 $(-r)$ together supply a current $+b$ through resistor 113. A current $r+g+b$ from source 95 flows through resistor 114.

During a picture VG with the associated signal 32 the current sources 99 . . . . . . . . 104 can conduct and sources 93 . . . . . . 98, 105 . . . . . . . 110 cannot conduct. Source 103 $(r+g)$ and source 100 $(-g)$ then together supply a current $(+r)$ through resistor 111. It follows for the terminals G, B and Y that these convey voltages corresponding to the signals $g$, $b$ and $r+g+b$. During a picture VB, the current sources 105 . . . . . . 110 are activated and the desired signals occur at the terminals R, G, B and Y.

A nomenclature comparison of the description of the convertor 16 of FIG. 2 and that of FIG. 4, which comprises the components 62 to 114 leads to the following: The convertor 16 of FIG. 4 is provided with a triplicate three-position change-over switch (78, 79 and 80; 81, 82 and 83; 84, 85 and 86) followed by three groups of three signal channels each. The three groups of signal channels are connected to the current sources 93 . . . . . 98, 99 . . . . . . 104 and 105 . . . . . . 110, respectively. Super-imposition stages are obtained in the groups of current sources by providing two current sources with a common load. The switches 24, 29, 29', 38, 48, 49, 50 and 78 . . . . . 86 shown as mechanical switches for the sake of simplicity in FIGS. 1 and 4 may be formed electronically in practice.

The embodiment of the convertor 16 shown in FIG. 4 may be transistorized in a simple manner. A completely integrated embodiment may be obtained with conventional circuits. Components may then of course be used which combine, for example, the switching functions of the switches 78 . . . . . 86 with the control of the current sources 93 . . . . . 110.

The starting point with reference to the description of FIG. 2 is that the charge image on the semiconductor layer 8 in the pick-up tube 1 of FIG. 1 is completely erased through the electron beam 14 within the scanning periods during one line period. When the charge image on the semiconductor layer 8 would not be completely erased due to insufficient charge transport through the electron beam 14 the color television camera is still able to supply chrominance signals which provide a picture of pure colors upon display.

It is assumed that a part $x$ of the charge image is left on the semiconductor layer 8 in the pick-up tube 1 of FIG. 1 after all scanning periods in each line period of the pictures. Since the factor $x$ is much smaller than the value of one, factors $x^2$, $x^3$ etc. are left out of consideration. During, for example, the seventh picture V7 of FIG. 2, it follows that the signal $P=(1-x)\,r+x\,(g+b)$, a part xr of the charge image being left on the layer 8 during the picture V7 while the remaining part $x\,(g+b)$ of the picture V6 is erased. The following Table 1 shows the signals P, Q and S which can be derived in the same manner from FIG. 2, which signals occur during the pictures VR, VG and VB.

TABLE 1

| | P | Q | S |
|---|---|---|---|
| VR | $(1-x)r+x(g+b)$ | $r+g+b$ | $(1-x)\,(r+b)+xg$ |
| VG | $(1-x)g+x(r+b)$ | $r+g+b$ | $(1-x)\,(r+g)+xb$ |
| VB | $(1-x)b+x(r+g)$ | $r+g+b$ | $(1-x)(g+b)+xr$ |

Instead of the combination of the signals $\bar{P}$, $\bar{Q} - \bar{S}$ and $\bar{S} - \bar{P}$ obtained with the aid of the subtractor stages 45 and 46 of FIG. 1 and applied to the switching stage 47, the combination of the signals $\bar{P} - x\bar{Q}$, $(1-x)\bar{Q} - \bar{S}$ and $\bar{S} - \bar{P}$ is made with the aid of three subtractor stages not shown and is applied to the switching stage 47. For the given Example of picture V7 it follows that the signal $(1-x)r + x(g+b) - x(r+g+b) = (1-2x)$r occurs at the output terminal $T_1$ of the change-over switch 48 and thus at the terminal 17 ($\bar{R}$). A Table 2 follows in the same manner from Table 1.

TABLE 2

| | | $\bar{P} - x\bar{Q}$ | $(1-x)\bar{Q} - \bar{S}$ | $\bar{S} - \bar{P}$ |
|---|---|---|---|---|
| VR | $T_1$ | $\bar{R} = (1-2x)r$ | $\bar{G} = (1-2x)g$ | $\bar{B} = (1-2x)b$ |
| VG | $T_2$ | $\bar{G} = (1-2x)g$ | $\bar{B} = (1-2x)b$ | $\bar{R} = (1-2x)r$ |
| VB | $T_3$ | $\bar{B} = (1-2x)b$ | $\bar{R} = (1-2x)r$ | $\bar{G} = (1-2x)g$ |

It is found that all chrominance signals having the same factor $(1-2x)$ are attenuated, which upon display does not exert any influence on the color purity and may optionally be compensated by an amplifier.

It will be evident that the normally used signal-handling and correction circuits such as block-level control circuits, gamma correction circuits, contour correction circuits etc. may be used in an embodiment of the color television camera according to the invention.

As compared with the monochrome camera the color television camera according to the invention requires only few extra components. Apart from the color filter 4 including the motor 5 normally occurring as an extra component, only the generator 25 and the convertor 16 are required both of which may be built up from electronic components in an integrated form and occupy very little space. The convertor 16 has the great advantage that it may be formed without a memory.

What is claimed is:

1. A color television camera comprising one pick-up tube including a photo-sensitive target plate, a video output, and an electron gun for producing an electron beam directed towards said target plate; a color filter positioned in an input light path to said target plate, said filter having a time variable transmission color; means for causing said beam to scan the target plate in the form of a line scan raster having a given field frequency, means for varying the transmission color in synchronism with said field frequency or an integral submultiple thereof; a converter having a plurality of outputs and an input coupled to said video output of the pick-up tube for converting video signals generated by the pick-up tube when the filter has successive transmission colors into substantially simultaneously occurring video signals at said plurality of outputs of the converter; and a generator having an output coupled to the electron gun for periodically interrupting the electron beam during each line scan period, said interrupted portions of each line scan on the target plate being displaced in the line direction relative to the interrupted portions of a previous line scan over substantially the same part of the target plate.

2. A camera as claimed in claim 1 where said generator supplies a substantially square-wave output signal which is successively phase shifted by substantially 120° in accordance with successive colors of the filter.

3. A camera as claimed in claim 2 wherein the generator comprises an oscillator having an output, a frequency divider having an input coupled to said oscillator output and an output, a phase shifter having an input coupled to said divider output and three outputs, a first change-over switch having three inputs coupled to said divider outputs respectively and an output coupled to the electron gun of the pick-up tube, and means for changing over said first switch at field or frame frequency so that said first switch output is coupled to a different one of the first switch inputs during each field or frame of three successive fields or frames respectively.

4. A camera as claimed in claim 2 wherein said generator output signal has a mark-to-space ratio of substantially 1:1, whereby said camera can be used in a television having three primary colors.

5. A camera as claimed in claim 2 wherein said output signal has a mark-to-space ratio of substantially 2:1 for cutting off the electron gun for substantially one third of each period of the square-wave signal, whereby said camera can be used in a television system having two primary colors.

6. A camera as claimed in claim 1 further comprising an on-off switch having a control input coupled to said generator and a resistor coupled to said on-off switch and a voltage source, the common point of the resistor and said on-off switch being coupled to a cathode of the electron gun.

7. A camera as claimed in claim 1 wherein the generator comprises an oscillator having an output; said converter comprising a second change-over switch having a control input coupled to said oscillator output, an input coupled to said video output of the pick-up tube, and a plurality of outputs; said converter having a plurality of signal channels coupled to said second switch outputs respectively and a plurality of outputs coupled to said channels respectively; at least one of said signal channels including a superimposition stage having a first input coupled to one of said channels, a second input coupled to another of said signal channels, and an output coupled to a converter output.

8. A camera as claimed in claim 7 wherein said generator supplies a substantially square wave output signal having a mark-to-space ratio of substantially 1:1 which is successively phase shifted by substantially 120° in accordance with successive colors of the filter, said second change-over switch comprising a three-position output change-over switch, said channels being three in number, said second switch three outputs being respectively coupled to said three signal channels, two of said channels respectively including first and second superimposition stages having outputs, said channels respectively comprising ganged third, fourth, and fifth switches each having a pole and three outputs, the outputs of the two superimposition stages and the remaining signal channel being coupled to the poles of third, fourth and fifth switches respectively, first corresponding outputs of said third, fourth, and fifth switches being coupled to first, second and third converter outputs respectively, second corresponding outputs thereof being coupled to the second, third and first converter outputs respectively, and third corresponding outputs thereof being coupled to the third, first and second converter outputs respectively, and means for changing over each of said poles of said third, fourth, and fifth switches from one output position to the next at said field or frame frequency.

9. A camera as claimed in claim 7 wherein each of said signal channels includes a lowpass filter, said camera including a luminance signal channel having a highpass filter having an input coupled to an output of said second change-over switch and an output, said camera further comprising a plurality of superimposition stages each of said stages having a first input coupled to said highpass filter output and a second input coupled to said outputs of said converter respectively.

10. A camera as claimed in claim 7 wherein said generator supplies a substantially square wave output signal having a mark-to-space ratio of substantially 1:1 and which is successively phase shifted by substantially 120° in accordance with successive colors of the filter, said second change-over switch comprises a triple section switch each section having three outputs, said channels being nine in number coupled to said second switch outputs respectively, the superimposition stage comprising a plurality of controllable current sources, and at least one common load coupled to a group of said current sources.

11. A camera as claimed in claim 10 wherein the generator comprises an oscillator having an output, a frequency divider having an input coupled to said oscillator output an an output, a phase shifter having an input coupled to said divider output and three outputs, a first change-over switch having three inputs coupled to said divider outputs respectively and an output coupled to said electron gun, means for changing over said switch at a field or frame frequency so that said switch output is coupled to a different one of the switch inputs during each field or frame of three successive fields or frames, a second phase shifter having an input coupled to said oscillator output and a succession of six outputs each for supplying a signal phase-shifted by substantially 60° relative to the previous output, said converter comprising gates each having first and second inputs and an output, six of said first gate inputs being coupled to said six second phase shifter outputs, the first, third and fifth phase shifter outputs being coupled to two gates each, a third change-over switch having an input coupled to said first switch output and three outputs, groups of three second inputs of said nine gates each being coupled to a different output of said third change-over switch output, said outputs of the nine gates being part of said triple three-position change-over switch.

12. A camera as claimed in claim 1 wherein the converter and the generator comprise a single integrated circuit.

* * * * *